United States Patent [19]
Anderson

[11] Patent Number: 5,401,140
[45] Date of Patent: *Mar. 28, 1995

[54] CLOSED LOOP SLUDGE FLOW CONTROL SYSTEM

[75] Inventor: Thomas M. Anderson, Hugo, Minn.

[73] Assignee: Schwing America, Inc., White Bear, Minn.

[*] Notice: The portion of the term of this patent subsequent to Nov. 2, 2010 has been disclaimed.

[21] Appl. No.: 198,470

[22] Filed: Feb. 18, 1994

Related U.S. Application Data

[60] Continuation of Ser. No. 113,841, Aug. 30, 1993, Pat. No. 5,336,055, which is a continuation-in-part of Ser. No. 981,982, Nov. 24, 1992, Pat. No. 5,257,912, which is a division of Ser. No. 595,457, Oct. 10, 1990, Pat. No. 5,106,272.

[51] Int. Cl.$^6$ ............................................. F04B 35/02
[52] U.S. Cl. ..................................... 417/63; 417/347; 417/900; 417/53
[58] Field of Search ................. 417/63, 342, 347, 317, 417/53, 900; 73/3, 239

[56] References Cited

U.S. PATENT DOCUMENTS

| | | | |
|---|---|---|---|
| 3,650,638 | 3/1972 | Cole | 417/342 |
| 4,178,826 | 1/1988 | Simmer | 417/234 |
| 4,454,736 | 10/1985 | Walton | 417/63 |
| 4,543,044 | 9/1985 | Simmons | 417/342 |
| 4,605,356 | 8/1986 | Uchida et al. | 417/102 |
| 4,611,973 | 9/1986 | Birdwell | 417/342 |
| 4,681,513 | 7/1987 | Saito et al. | 417/2 |
| 4,781,066 | 11/1988 | Pope et al. | 73/239 |
| 4,790,728 | 12/1988 | Dwyer | 417/342 |
| 4,850,805 | 7/1989 | Madsen et al. | 417/18 |
| 4,938,054 | 7/1990 | Dye et al. | 73/3 |
| 5,222,867 | 6/1993 | Walker, Sr. et al. | 417/12 |
| 5,222,872 | 6/1993 | Marian et al. | 417/900 |
| 5,230,608 | 7/1993 | Januska | 417/44 |
| 5,257,912 | 11/1993 | Oakley et al. | 417/63 |

Primary Examiner—Richard A. Bertsch
Assistant Examiner—Charles G. Freay
Attorney, Agent, or Firm—Kinney & Lange

[57] ABSTRACT

A system and method for controlling operation of a sludge material handling system is disclosed. The sludge material handling system includes a positive displacement piston/cylinder pump, a sludge material feed system which delivers sludge material to the pump, and a sludge material disposal system which receives and disposes of sludge material from the pump. A first parameter is sensed, the first parameter bearing a known relationship to an actual volume of sludge material delivered during a pumping cycle. An output value is determined from the first parameter. A control signal is provided as a function of the output value.

20 Claims, 9 Drawing Sheets

CLOSED LOOP SLUDGE FLOW CONTROL SYSTEM

This is a continuation of application Ser. No. 08/113,841, filed Aug. 30, 1993, now U.S. Pat. No. 5,336,055 of Thomas M. Anderson for CLOSED LOOP SLUDGE FLOW CONTROL SYSTEM, which is a continuation-in-part application of Ser. No. 07/981,982, filed on Nov. 24, 1992 of Oakley et al. for SLUDGE FLOW MEASURING SYSTEM, now U.S. Pat. No. 5,257,912, which is a divisional application Ser. No. 07/595,457, filed on Oct. 10, 1990, of Oakley et al. for SLUDGE FLOW MEASURING SYSTEM, now U.S. Pat. No. 5,106,272.

BACKGROUND OF THE INVENTION

The present invention relates to systems for disposing of sludge material. In particular, the present invention relates to a sludge material handling system in which a positive displacement pump, a sludge material feed system which delivers sludge to the positive displacement pump and a sludge material disposal system which receives and disposes of sludge from the positive displacement pump can be controlled as a function of an actual volume of sludge delivered by the pump during one or more pumping cycles.

In recent years, sludge pumps have found increasing use for conveying sludge through pipelines in municipal and industrial applications. Positive displacement sludge pumps offer a number of significant advantages over screw or belt conveyers. For example, a positive displacement sludge pump can pump sludge through a pipeline while containing odors in order to maintain a safe and secure working environment. Positive displacement pumps are capable of pumping thick, heavy sludge materials which may not be practical for belt or screw conveyers. This is particularly important where the sludge material needs to be dried and burned in an incinerator.

Pump and pipeline systems also take up less space than screw or belt conveyers and, with the use of simple elbow pipes, are capable of transporting sludge materials around corners. Additionally, positive displacement sludge pumps offer a reduction in noise over mechanical conveyers as well as greater cleanliness and reduced spillage.

Various state and federal regulations covering the processing and disposal of sludge require that the processor accurately measure and record the amount of material handled. Positive displacement sludge pumps such as those described in Oakley et al., U.S. Pat. No. 5,106,272, entitled "SLUDGE FLOW MEASURING SYSTEM", can accurately measure the volume of sludge transported. Oakley et al., discloses a system for transporting high solids sludge which includes a positive displacement pump for pumping sludge through a pipeline. The volume of sludge transported is accurately measured by determining the fill percentage of the pumping cylinder during each pumping cycle. The fill percentage is determined by using any of a number of sensed parameters including material flow signals, measured time intervals, hydraulic fluid pressure, and hydraulic fluid flow rate during each pumping cycle.

One embodiment of the system and pump disclosed in Oakley et al., includes a valve, commonly referred to as a poppet valve, between the pumping cylinder and the outlet which opens and connects the pumping cylinder to the outlet only when the pressure within the pumping cylinder essentially equals the pressure at the outlet. The timing of the opening of the outlet poppet valve during the outlet stroke provides a means for determining the fill percentage or the total volume delivered during each pumping stroke.

A second embodiment of the system and pump disclosed in Oakley et al. includes and outlet valve, commonly referred to as a pivoting transfer tube valve, which connects the outlet to the pumping cylinder during the entire pumping stroke. In this embodiment, both the hydraulic pressure driving the piston and the outlet pressure are sensed during the pumping stroke. Determining either the time or the piston position during each pumping stroke when the hydraulic pressure equals the outlet pressure can be used to derive a fill percentage or volume delivered during each of the pumping strokes.

In a typical sludge material handling system, a sludge material feed system delivers sludge to the positive displacement pump. The sludge material feed system may include a belt press, an auger, a centrifuge or other devices for drying the sludge and or delivering if to the positive displacement pump.

The sludge material handling system also typically includes a sludge material disposal system which disposes of sludge pumped by the positive displacement pump. Typically, the sludge material disposal system will include an incinerator which incinerates the sludge. However, the sludge material disposal system could include other means of disposing of the sludge material in accordance with Environmental Protection Agency (EPA) regulations. For example, the sludge material disposal system could include a truck which transports the sludge to a remote area where it is spread out over the ground.

In any case, EPA regulations frequently require accurate measurement and recording of the amount of sludge which is being disposed. In most instances, a sludge material handling system requires at least three or four individuals to monitor and control the sludge material feed system, the positive displacement pump and the sludge material disposal system. Employing a number of individuals to monitor and control the sludge material handling system adds significant cost to the disposal of sludge. Additionally, present systems leave room for human error and makes it difficult to keep accurate records of the amount of sludge handled by the system. Keeping accurate records is typically necessary to satisfy EPA requirements.

SUMMARY OF THE INVENTION

The present invention is based upon the recognition that a sludge material handling system with a positive displacement piston/cylinder pump, together with a system which determines the percent fill of the pump cylinder(s) or actual volume of sludge delivered during a pumping cycle, offers the capability of automatically controlling the pump automatically controlling a sludge material feed system which delivers sludge to the pump and automatically controlling a sludge material disposal system which receives and disposes of sludge from the pump.

It is not normally possible to fill the cylinder(s) of a positive displacement pump to 100% of the known capacity. The sludge being pumped typically contains air and other compressible materials. Therefore, a portion of each pumping stroke of the positive displacement pump involves simply compressing the sludge in the cylinder before the pressure driving the piston overcomes the pressure at the outlet of the pump so that the sludge begins to flow out of the cylinder. In the present invention, at least one parameter related to operation of the positive displacement pump is sensed in order to identify the point during the pumping stroke when the hydraulic pressure applied to the piston is sufficient to overcome the outlet pressure (so that sludge material begins to be pumped out of the cylinder). From that information, which bears a known relationship to an actual volume of sludge delivered during a pumping cycle, the pump as well as upstream and down stream components of the sludge material handling system may be controlled.

The sludge material handling system of the present invention includes a positive displacement piston/cylinder pump for pumping sludge through a pump outlet during each pumping stroke. A sludge material feed system delivers sludge to a positive displacement pump inlet. The positive displacement pump delivers sludge through the pump outlet to a sludge material disposal system. A parameter is sensed during each pumping stroke, the parameter being related to operation of the pump and having a known relationship to an actual volume of sludge delivered during the pumping stroke. An output value is determined from the parameter sensed. A control signal is provided as a function of the output value.

DETAILED DESCRIPTION OF THE PREFERRED EMBODIMENTS

A. Overview of Pump 10

Figure 1:
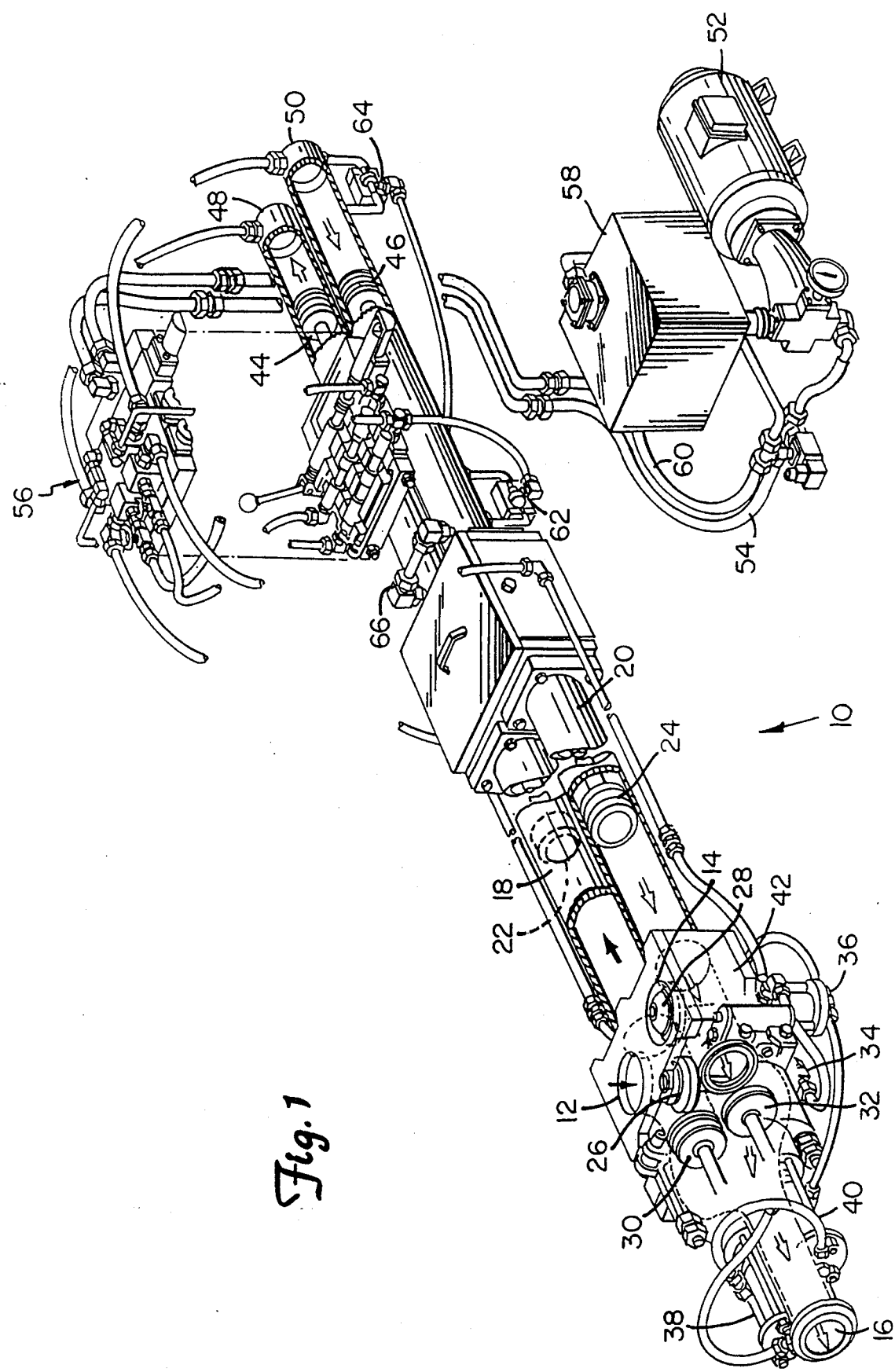
FIG. 1 is a perspective view, with portions broken away, of a sludge pump system which uses inlet and outlet poppet valves.

FIG. 1 shows a two cylinder hydraulically driven positive displacement sludge pump 10 which could be used with the present invention. It should be noted, however, that other sludge pumps with variations in the configuration of the hydraulic and control valve mechanisms could be used as well. Pump 10 includes inlets 12 and 14, outlet 16, material cylinders 18 and 20, material pistons 22 and 24, inlet poppet valves 26 and 28, outlet poppet valves 30 and 32, hydraulic inlet valve cylinders 34 and 36, hydraulic outlet valve cylinders 38 and 40, poppet valve housing 42, hydraulic drive pistons 44 and 46, hydraulic cylinders 48 and 50, hydraulic pump 52, high pressure lines 54, control valve assembly 56, hydraulic reservoir 58, low pressure line 60, forward and rear switching valves 62 and 64 and interconnection 66.

High solids sludge material (sludge) is received at inlets 12 and 14, and is pumped through outlet 16, typically to a pipeline (not shown). Material pistons 22 and 24 reciprocate in material cylinders 18 and 20. Inlet poppet valve 26 controls the flow of sludge from inlet 12 to material cylinder 18. Similarly, inlet poppet valve 28 controls the flow of sludge from inlet 14 to material cylinder 20. The flow of sludge from cylinder 18 and 20 to outlet 16 is controlled by outlet poppet valves 30 and 32, respectively.

Inlet poppet valves 26 and 28 are controlled by hydraulic inlet valve cylinders 34 and 36, respectively. Outlet poppet valves 30 and 32 are controlled by hydraulic outlet valve cylinders 38 and 40.

In the particular position shown in FIG. 1, inlet poppet valve 26 and outlet poppet valve 32 are in an open position. This means that piston 22 is moving away from poppet valve housing 42, while piston 24 is moving toward poppet valve housing 42. Sludge is being drawn through inlet 12 and into cylinder 18, while sludge is being pumped from cylinder 20 to outlet 16.

Material pistons 22 and 24 are coupled to hydraulic drive pistons 44 and 46, respectively, which move in hydraulic cylinders 48 and 50. Hydraulic fluid is pumped from hydraulic pump 52 through high pressure lines 54 to control valve assembly 56. Although not shown in FIG. 1, hydraulic pump 52 may be driven by an input shaft connected to a separate motor. Assembly 56 includes throttle and check valves which control the sequencing of high and low pressure hydraulic fluid to hydraulic cylinders 48 and 50 and to poppet valve cylinders 34, 36, 38 and 40. Low pressure hydraulic fluid returns to hydraulic reservoir 58 through low pressure line 60 from valve assembly 56.

Forward and rear switching valves 62 and 64 sense the position of piston 46 at the forward and rear ends of travel and are interconnected to control valve assembly 56. Each time piston 46 reaches the forward or rear end of its travel in cylinder 50, a valve sequence is initiated which results in the closing of all four poppet valves and a reversal of the high pressure and low pressure connections to cylinders 48 and 50.

The sequence of operations of pump 10 is generally as follows. As drive pistons 44 and 46 and their connected material pistons 22 and 24 come to the end of their stroke, one of the material cylinders (in FIG. 1, cylinder 20) is discharging material to outlet 16, while the other cylinder 18 is loading material from inlet 12. At the end of the pumping stroke, material piston 24 is at its closest point to poppet valve housing 42, while piston 22 is at its position furthest from poppet valve housing 42. At this point, switching valve 62 senses that hydraulic drive piston 46 has reached the forward end of its stroke. Valve assembly 56 is activated which causes poppet valve cylinders 34 and 40 to be actuated. This causes inlet poppet valve 26 and outlet poppet valve 32 to close.

At this point, pistons 22 and 24 are at the ends of their stroke, and their direction of movement is about to reverse. All four poppet valves 26, 28, 30 and 32 are closed. Hydraulic pressure begins to increase in cylinder 48, which drives piston 44 forward. In turn, piston 22 moves forward toward poppet valve housing 42. Piston 22, therefore, is now in a pumping or discharging stroke. At the same time, hydraulic fluid located forward of piston 44 is being transferred from cylinder 48 through interconnection 66 to the forward end of cylinder 50. This applies hydraulic pressure to piston 46 to move it in a rearward direction. As a result, material piston 24 begins moving away from poppet valve housing 42 and it is in a loading or filling stoke. When the pressure in valve housing 42 below poppet valve 28 essentially equals the pressure on the inlet side, poppet valve 28 opens, which allows sludge to flow through inlet 14 and into cylinder 20 during the filling stroke.

As piston 22 begins to move forward, it first compresses the sludge within cylinder 18. At the moment when the compressed sludge equals the pressure of the compressed sludge in outlet 16, poppet valve 30 opens. Since the poppet valve for the discharging cylinder opens only when the pressure of the content of a cylinder essentially equals the pressure in the pipeline, no material can flow back.

The operation continues, with piston 22 moving forward and piston 24 moving rearward until the pistons reach the end of their respective strokes. At that point, switching valve 64 causes valve assembly 56 to close all four poppet valves and reverse the connection of the high and low pressure fluids to cylinders 48 and 50. The operation continues with one material piston 22 or 24 operating in a filling stroke while the other is operating in a pumping or discharge stroke.

It should be noted that pump 10 is one of several positive displacement pump configurations which could be used with the present invention. For example, pump 10 could be of the type which uses a pivoting transfer tube valve, instead of poppet valves, to connect the pumping cylinder to the outlet during the entire pumping stroke. Detailed discussions of several positive displacement pumps which could be used with the present invention may be found in Oakley et al., U.S. Pat. No. 5,106,272, which is incorporated herein by reference.

B. Monitoring System 100

Figure 2:
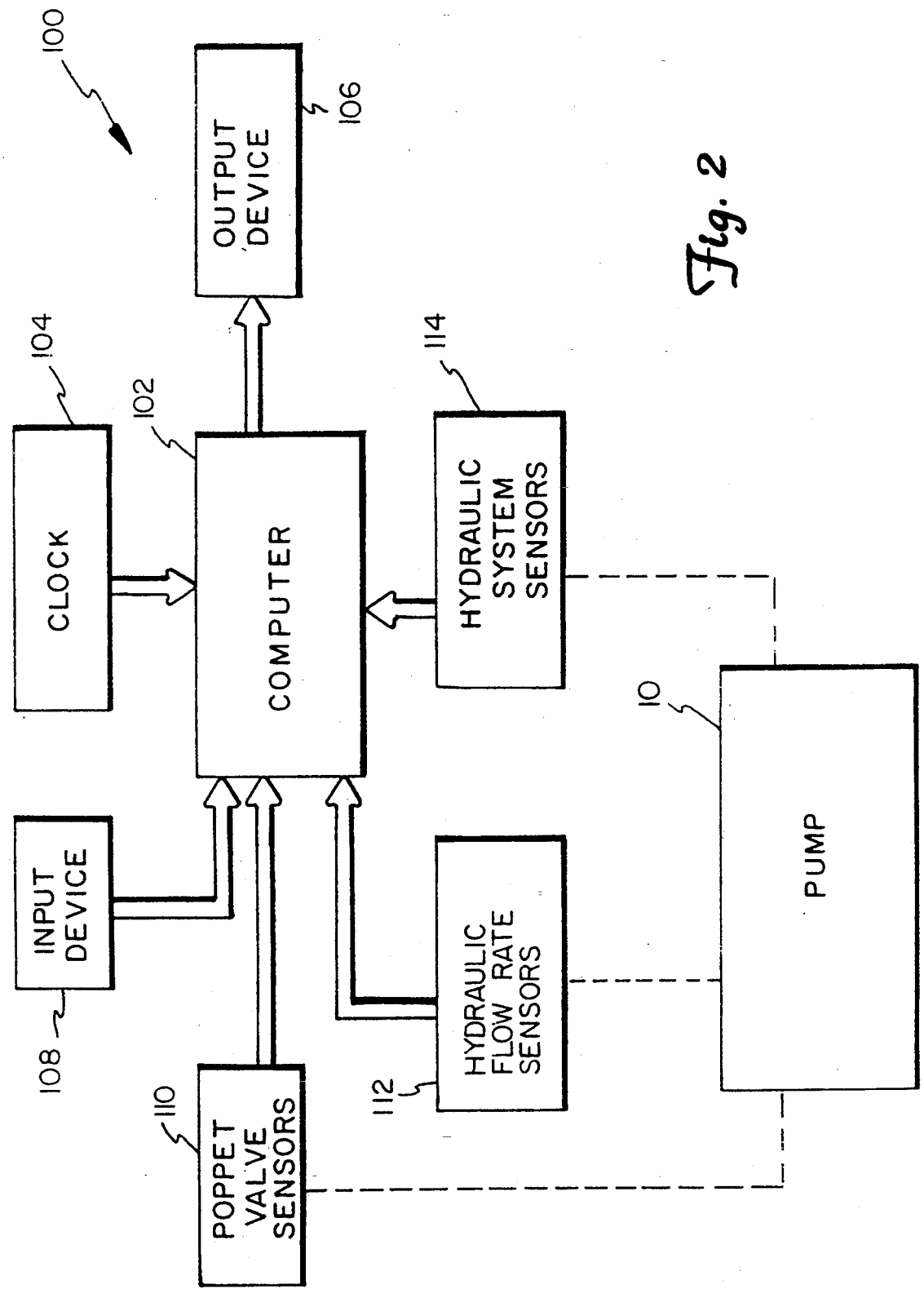
FIG. 2 is a block diagram of a monitoring system for determining instantaneous and accumulated volumes of sludge materials pumped by a positive displacement pump.

FIG. 2 shows one possible embodiment of a monitoring system which monitors the operation of pump 10 to provide accurate measurement of the volume of sludge pumped on a cycle-by-cycle basis and on an accumulated basis. Monitor system 100 includes pump 10, computer 102, which in a preferred embodiment is a microprocessor-based computer including associated memory and associated input/output circuitry, clock 104, output device 106, input device 108, poppet valve sensors 110, hydraulic flow rate sensors 112, and hydraulic system sensors 114.

Clock 104 provides a time base for computer 102. Although shown separately in FIG. 2, clock 104 may be contained as part of computer 102.

Output device 106 is preferably any of a number of devices. For example output device 106 can include a display output such as a cathode ray tube or a liquid crystal display. Output device 106 can also be a printer, or a communication device such as a cellular phone which transmits the output of computer 102 to another computer based system (which may monitor or control the overall operation in which pump 10 is being used).

Input device 108 can also take a variety of forms. In one preferred embodiment input device 108 is a keypad entry device. Input device 108 can also be a keyboard, a remote program device or any other suitable mechanism for providing information to computer 102.

Sensors 110, 112 and 114 monitor the operation of pump 10 and provide signals to computer 102. The parameters sensed by sensors 110, 112 and 114 provide an indication of the percent fill of the pumping cylinder during each pumping stroke of pump 10, and allow computer 102 to determine the time period of each cycle. From this information, computer 102 determines the volume of material pumped during that particular cycle, the accumulated volume pumped during a number of pumping cycles, the instantaneous pumping rate and/or an average pumping rate over a selected period of time. Computer 102 stores the data in memory, and also provides signals to output device 106 based upon the particular information selected by input device 108.

In one preferred embodiment, the determination of volume pumped during a pumping cycle is as follows. Hydraulic system sensors 114 provide signals to computer 102 indicating the start time and stop time of each pumping stroke is pump 10. These signals are supplied to computer 102 by sensors 114 preferably in the form of interrupt signals.

Poppet valve sensors 110 sense when the outlet poppet valve opens during the pumping stroke. The signal from poppet valve sensors 110 are also preferably in the form of an interrupt signal to computer 102.

Hydraulic flow rate sensors 112 are preferably located near hydraulic pump 52 and sense the flow rate of hydraulic fluid from pump 52. Sensors 112 are used to provide an indication to computer 102 that the velocity of pistons 22 and 24 has remained essentially constant during each pumping cycle. Signals from sensors 112 are preferably in the form of digitally converted analog signals to computer 102. In other preferred embodiments, if piston velocity is not intended to remain constant, sensors 112 are used to adjust the calculated volume of sludge pumped during each pumping stroke.

As pistons 22 and 24 travel through cylinders 18 and 20 during their respective pumping strokes, sludge in the cylinders is compacted. When the sludge in a cylinder is near fully compacted, the pressure in that cylinder increases as piston 22 or 24 continues to move forward in its pumping stroke. The time, during each pumping stroke, that an outlet poppet valve opens is representative of the time that the piston (22 or 24) has built up sufficient pressure to push sludge out of the cylinder, through outlet 16, to a pipeline.

Computer 102, which receives signals from hydraulic systems sensors 114 indicating the start and stop times of each pumping stroke, and poppet valve sensors 110 indicating that sludge is being pumped out of the cylinder, determines a fill percentage by dividing the pumping stroke time after the poppet valve opens by the total pumping stroke time.

If hydraulic flow rate sensors 112 provide computer 102 with information indicating that piston velocity did not remain essentially constant, adjustments are made to the calculated fill percentage because this method of calculating fill percentage is actually based upon the ratio of the length of the piston stroke after the poppet valve opens to the total stroke length.

Knowing the total displacement volume of the cylinder and the calculated percentage fill during each pumping stroke, computer 102 calculates the actual volume pumped during each cycle. That value may be stored in a register within the memory of computer 102 and/or supplied to another computer which monitors system 100 and pump 10. In addition, computer 102 updates a register which keeps an accumulated total volume pumped.

Because computer 102 may also determine the length of time during each cycle and the accumulated time during which an accumulated volume has been pumped, it is possible to calculate an instantaneous pumping rate for each cycle, as well as an average pumping rate over the accumulated time. All four values (volume pumped in a particular cycle, total accumulated volume, instantaneous pumping rate, and average pumping rate) can be calculated by computer 102.

It should be noted that monitor system 100 is one of many monitoring system configurations which could be used to calculate a percent fill, or an actual volume of sludge pumped, during each pumping stroke. For example, monitor system 100 could include piston position sensors, instead of hydraulic system sensors 114, to notify computer 102 of the start and stop times of each pumping stroke. Also, different monitoring systems may be necessary for different positive displacement pump configurations. Any monitoring system capable of calculating the percent fill of each pumping stroke of a positive displacement piston cylinder pump could be substituted for system 100 and used with the present invention.

C. Sludge Material Handling System 150

Figure 3:
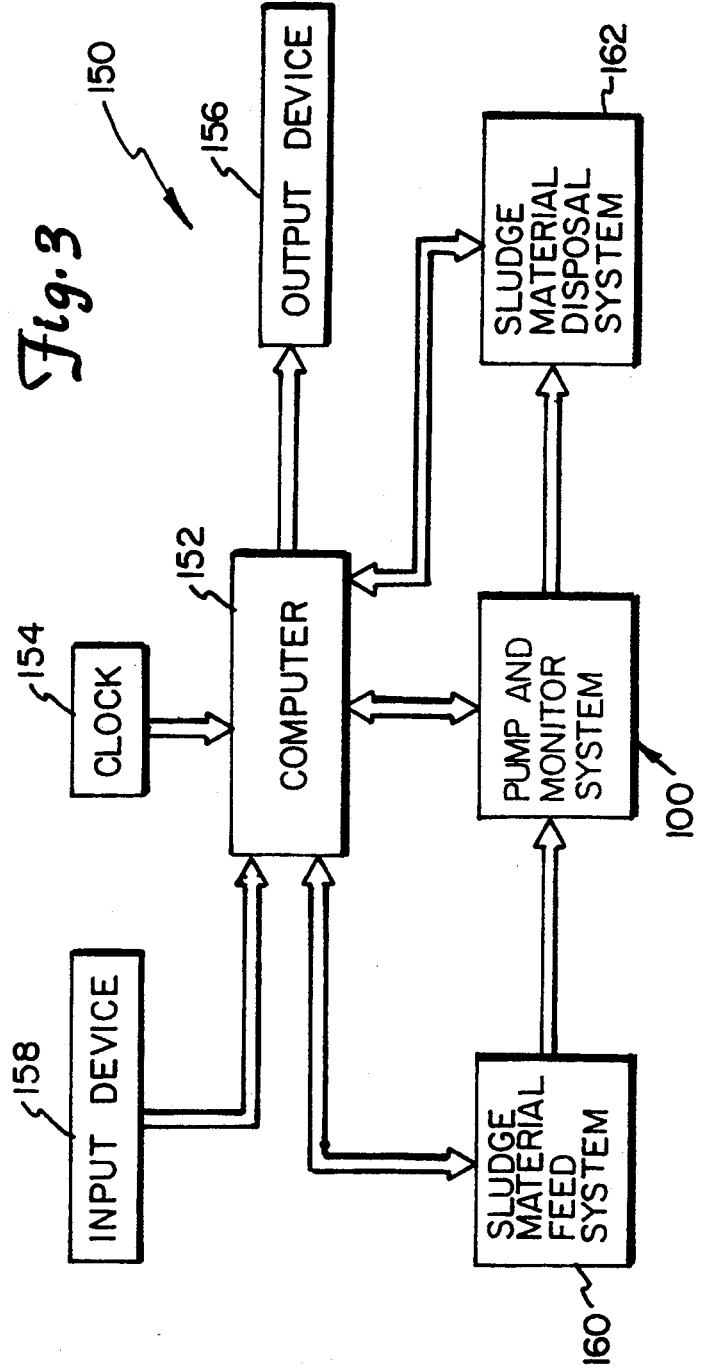
FIG. 3 is a block diagram of a control system for controlling a sludge material handling system.

FIG. 3 shows a preferred embodiment of sludge material handling system 150 of the present invention. System 150 includes monitor system 100 (including pump 10), computer 152, clock 154, output device 156, input device 158, sludge material feed system 160 and sludge material disposal system 162. In a preferred embodiment, computer 152 is a microprocessor-based computer including associated memory and associated input/output circuitry. Clock 154 provides a time base for computer 152. Although shown separately in FIG. 3, clock 154 may be contained as part of computer 152. Output device 156 can include a display output such as a cathode ray tube or a liquid crystal display. Output device 156 can also be a printer, or a communication device such as a cellular phone which transmits the output of computer 152 to another computer based system. Input device 158 can also take a variety of forms. In one preferred embodiment input device 158 is a keypad entry device. Input device 158 can also be a keyboard, a remote program device or any other suitable mechanism for providing information to computer 152.

Although in FIG. 3 computer 152, clock 154, output device 156 and input device 158 are shown separate from computer 102, clock 104, output device 106 and input device 108 of monitor system 100, in other preferred embodiments system 100 and system 150 are integrated and share these components.

Sludge material feed system 160 can be any of a number of devices capable of drying sludge and/or supplying sludge to pump 10. For example. Feed system 160 can be a centrifuge which is used to dry sludge and supply it to pump 10 for pumping to sludge material disposal system 162. Feed system 160 can also be a belt conveyer of a screw-type feeder. Feed system 160 can even include manual dumping, by a human operator, of sludge into a hopper or intake area of pump 10.

Sludge material disposal system 162 can be any device which disposes of sludge delivered by pump 10. In many instances, the disposal of sludge with disposal system 162 is regulated by the EPA. Typically, disposal system 162 is an incinerator which incinerates the sludge delivered by pump 10 in accordance with EPA regulations. However, disposal system 162 can also be a truck which is loaded with sludge from pump 10 and which transports the sludge to another location for disposal.

D. Determination of Weight of Sludge Material Pumped

EPA regulations often allow the disposal of only certain quantities of sludge. These quantities may be based on volume, but instead, are frequently based on weight. System 150 can be used to determine the weight of sludge pumped during a single pumping cycle and an accumulated weight pumped over a number of pumping cycles.

Typically, a user of system 150 knows the weight per volumetric unit of the particular sludge material being pumped. This information is supplied to computer 152 through input device 158. Through output device 106, system 100 provides computer 152 with information representative of the volume of sludge pumped during a single pumping cycle, the accumulated volume pumped over a number of pumping cycles, the instantaneous volumetric pumping rate and the average volumetric pumping rate. Computer 152 determines, from this information and from the weight per volumetric unit, the weight of sludge pumped during a single pumping cycle, the accumulated weight pumped over a number of pumping cycles, the instantaneous weight pumping rate, and the average weight pumping rate.

Clock 154 provides computer 152 with information indicating the dates and times that the sludge is pumped. This information is useful in providing date stamped readouts, for the EPA, which verify dates and times of the disposal of quantities (by volume or weight) of sludge.

Computer 152 stores the above information in memory and provides signals to output device 156 based upon a particular information format selected by input device 158. The date stamped information may be recorded on a chart recorder, printed out in a report format or stored in a database for future use.

E. Control of Pump 10, Feed System 160 and Disposal System 162

Because handling system 150, with the help of monitor system 100, can determine actual quantities (volume or weight) of sludge pumped by pump 10, system 150 can more easily control the processing of sludge. Based upon the percent fill of each cylinder as determined by monitor system 100, computer 152 of handling system 150 controls the operation of any or all of pump 10, feed system 160 and disposal system 162. Control of feed system 160 can include controlling the starting, the stopping and the rate of feed operations. Control of pump 10 can include controlling starting and stopping of the pump. It can also include controlling the pump speed. Control of disposal system 162 varies greatly depending on the particular type of disposal system used. For example, if system 162 includes an incinerator, computer 152 can control the operating temperature, the amount of fuel used to incinerate the sludge, and other operating parameters of the incinerator.

In one preferred embodiment of the present invention, a user of material handling system 150 inputs, through input device 158, a maximum quantity of sludge to be processed by system 150. As discussed above, computer 152 determines, from the measured accumulated volume of sludge pumped by pump 10 and from the weight per volumetric unit of the sludge, an accumulated weight of sludge pumped by pump 10 after each pumping stroke. When the accumulated weight of sludge processed by system 150 equals the maximum quantity of sludge to be processed, computer 152 generates a control signal to control one or more of pump 10, feed system 160 and disposal system 162.

Figure 4:
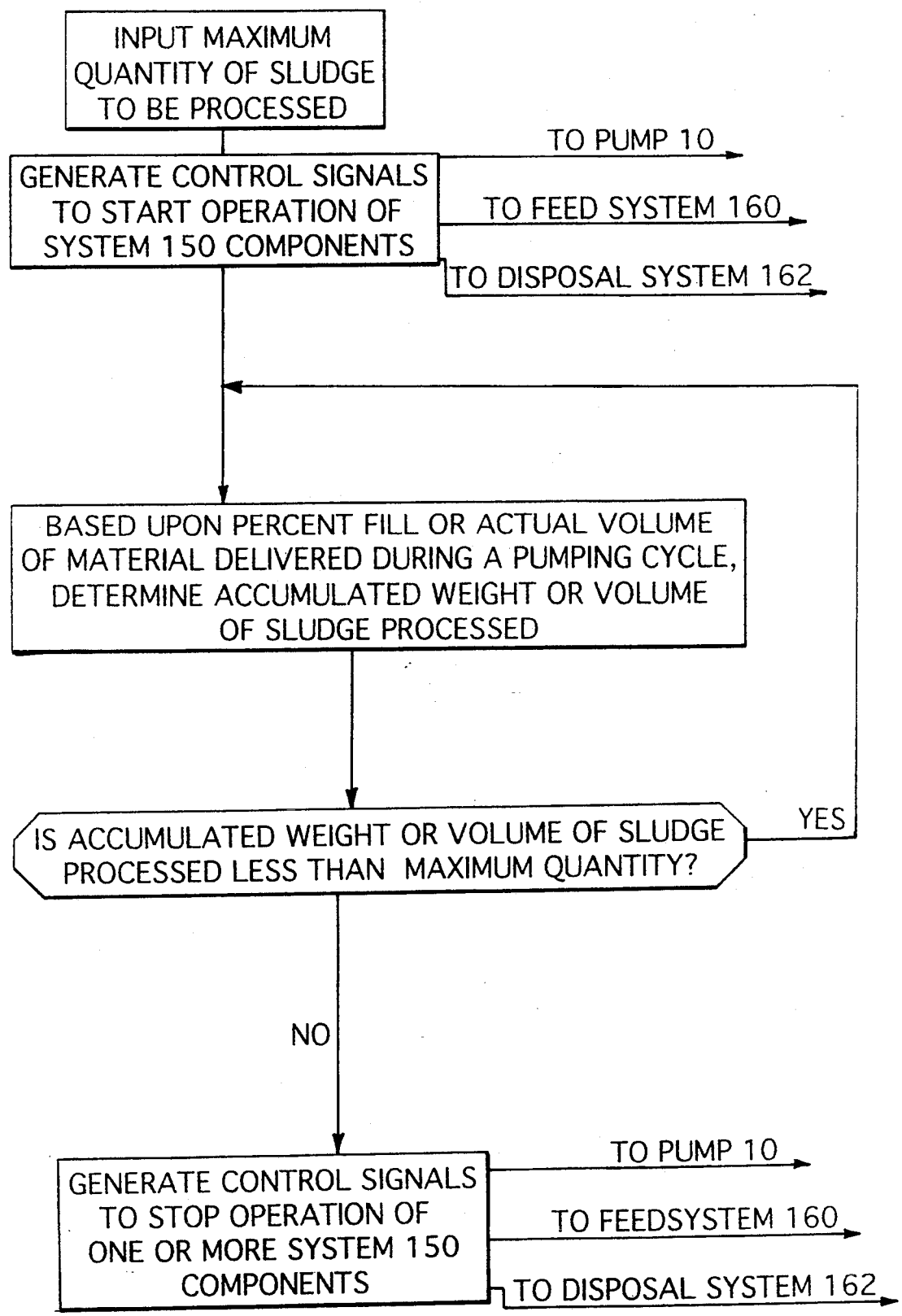
FIGS. 4–8 are flow charts illustrating methods of controlling a sludge material handling system in accordance with preferred embodiment of the present invention.

For example, the control signal can cause feed system 160 to stop delivering sludge to pump 10. In this case, computer 152 may also generate additional control signals to control pump 10 and/or disposal system 162. The additional control signals can be used to cause pump 10 to stop pumping and disposal system 162 to stop operating as well. However, in alternate embodiments, one or both of pump 10 and disposal system 162 is allowed to continue operating after feed system 160 is stopped in order to clean out sludge remaining in the system. FIG. 4 is a flow chart which illustrates one method of controlling material handling system 150 in the manner described above.

While in preferred embodiments control signals are generated to control pump 10, feed system 160 and disposal system 162, it should be noted that any one of pump 10, system 160 and system 162 can be controlled alone by system 150.

Figure 5:
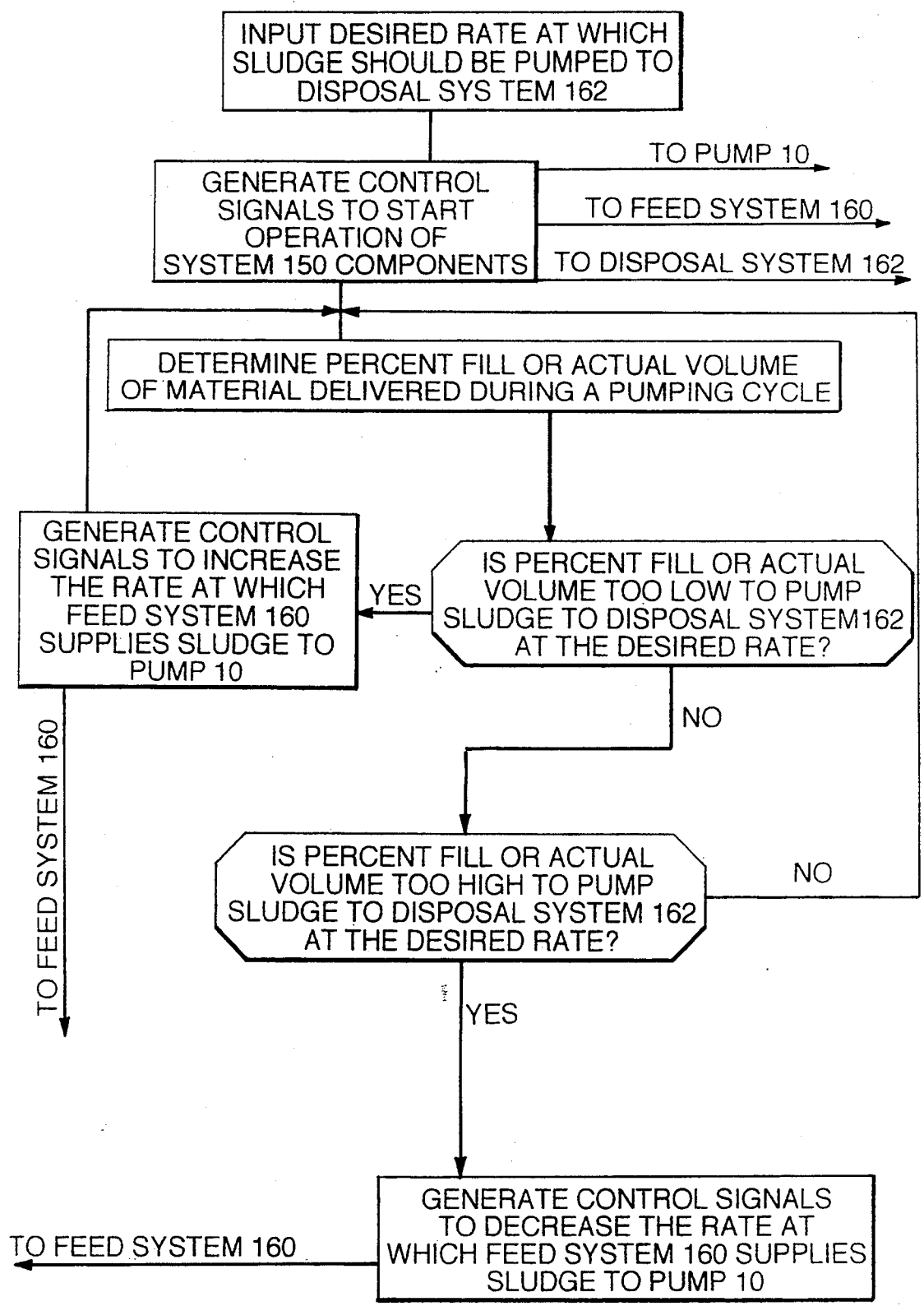

For example, in one preferred embodiment of the present invention, a user inputs through input device 158 a desired rate at which pump 10 is to pump sludge to disposal system 162. Monitor system 100 provides computer 152 with the percent fill during each pumping stroke. Based upon the percent fill during each pumping stroke or over a number of pumping strokes, computer 152 generates control signals which control the rate of which feed system 160 supplies sludge to pump 10. If the percent fill is too low for pump 10 to pump sludge at the desired rate, the rate at which feed system 160 supplies sludge to pump 10 is increased. Likewise, if the percent fill is too high for pump 10 to pump sludge at the desired rate, the rate at which feed system 160 supplies sludge to pump 10 is decreased. This method of controlling material handling system 150 is illustrated in the flow chart shown in FIG. 5.

Figure 6A:
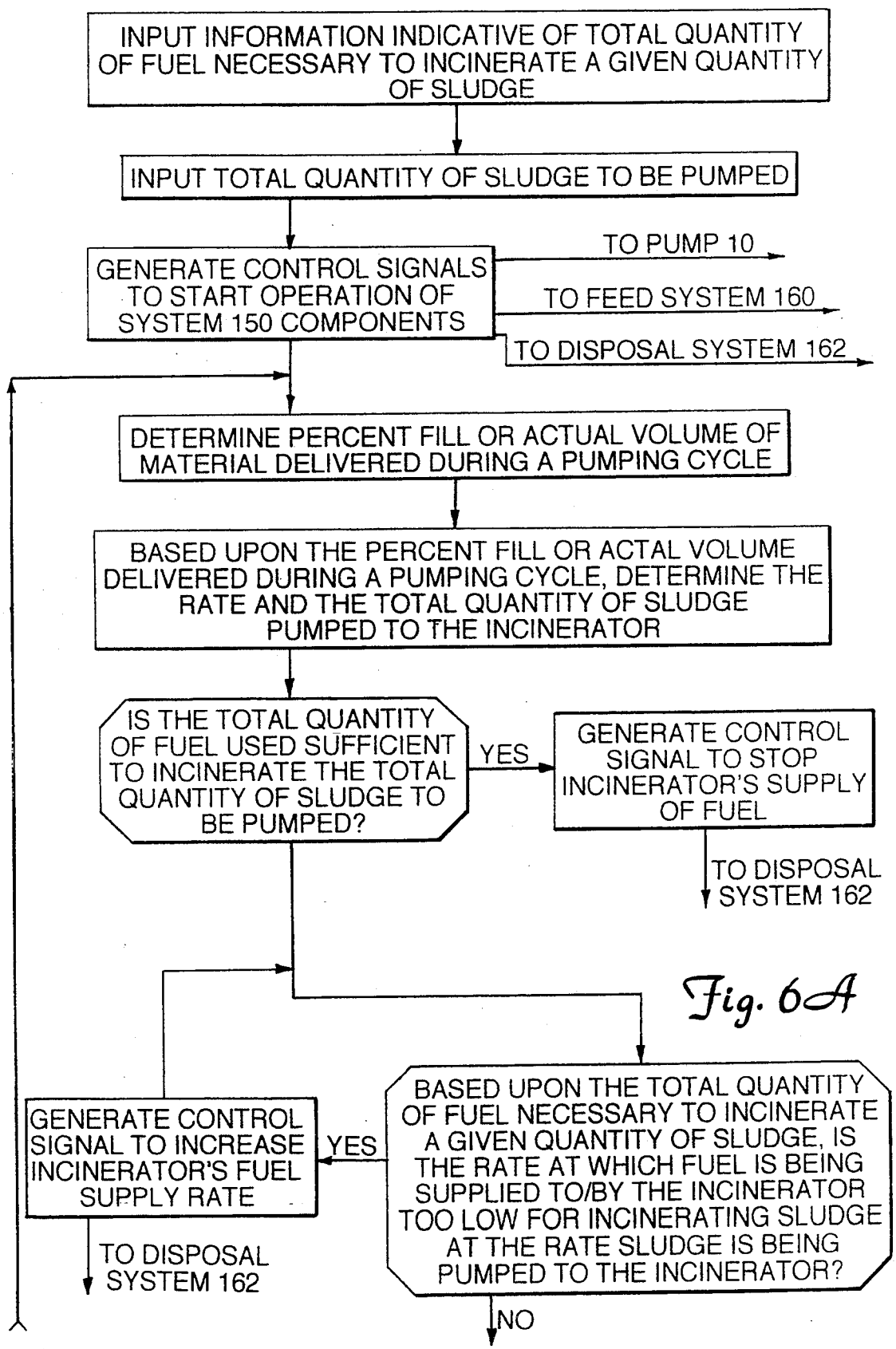
Figure 6B:
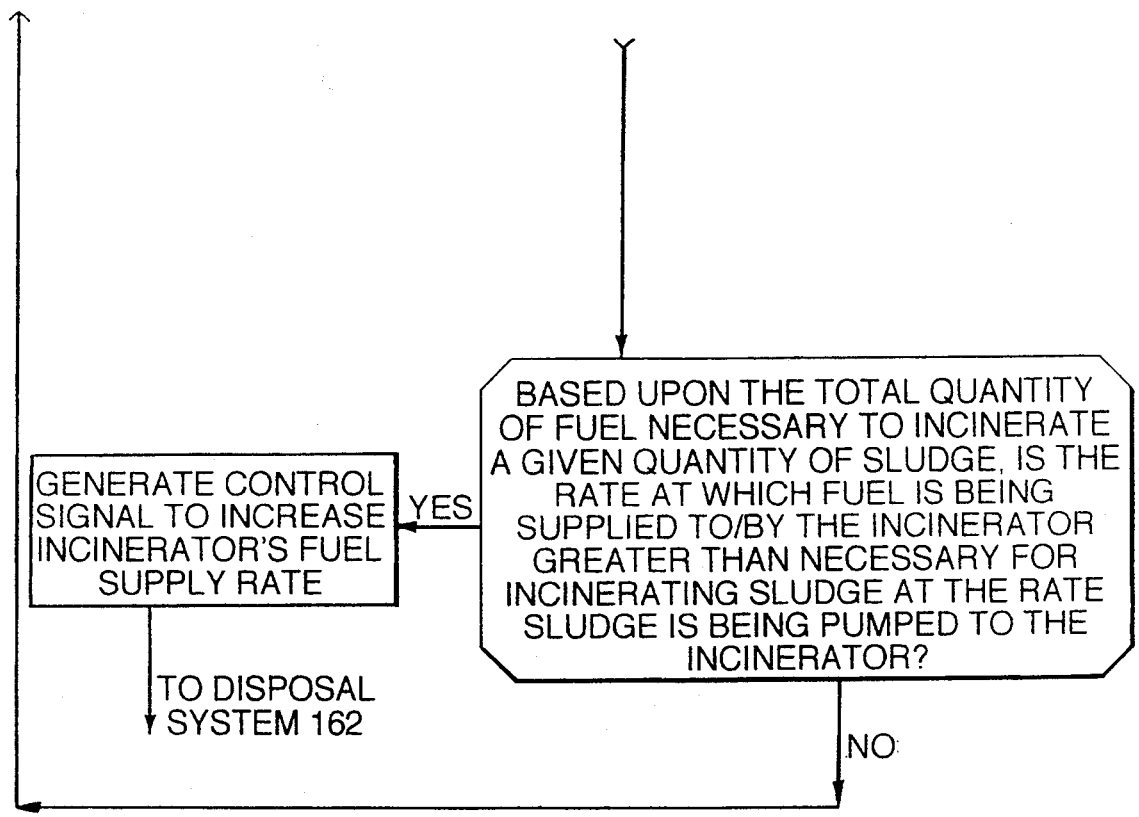

In another preferred embodiment, disposal system 162 includes an incinerator which requires a known quantity of fuel to incinerate a given quantity of sludge. This information is supplied to computer 152 by input device 158. Monitor system 100 provides computer 152 with the percent fill during each pumping stroke. Based upon the percent fill during each pumping stroke and over a number of pumping strokes, computer 152 generates control signals which control the rate and/or total quantity of fuel used by disposal system 162 while incinerating the sludge. One method of controlling material handling system 150 in accordance with this preferred embodiment is illustrated in the flow chart shown in FIGS. 6A and 6B.

In another preferred embodiment of the present invention, disposal system 162 also includes an incinerator. However, in this embodiment, there is a known relationship between the quantity of sludge material supplied to the incinerator and the temperature at which the incinerator operates. This information is supplied to computer 152 through input device 158. An operator of system 150 inputs, through input device 158, a desired incinerator temperature and the weight of the sludge per volumetric unit. Based upon the known relationship between the quantity of sludge material incinerated and the incinerator temperature, computer 152 generates control signals which control one or both of feed system 160 and pump 10 so that a sufficient quantity of sludge is supplied to disposal system 162 to maintain the desired incinerator temperature.

In other preferred embodiments, control signals generated by computer 152 need not be based only on sensed parameters relating to an actual volume of sludge delivered during each pumping cycle. Computer 152 can also sense parameters related to the operation of feed system 160 and/or disposal system 162 and generate control signals based upon the combination of the actual volume of sludge delivered during each pumping cycle and these parameters.

Figure 7:
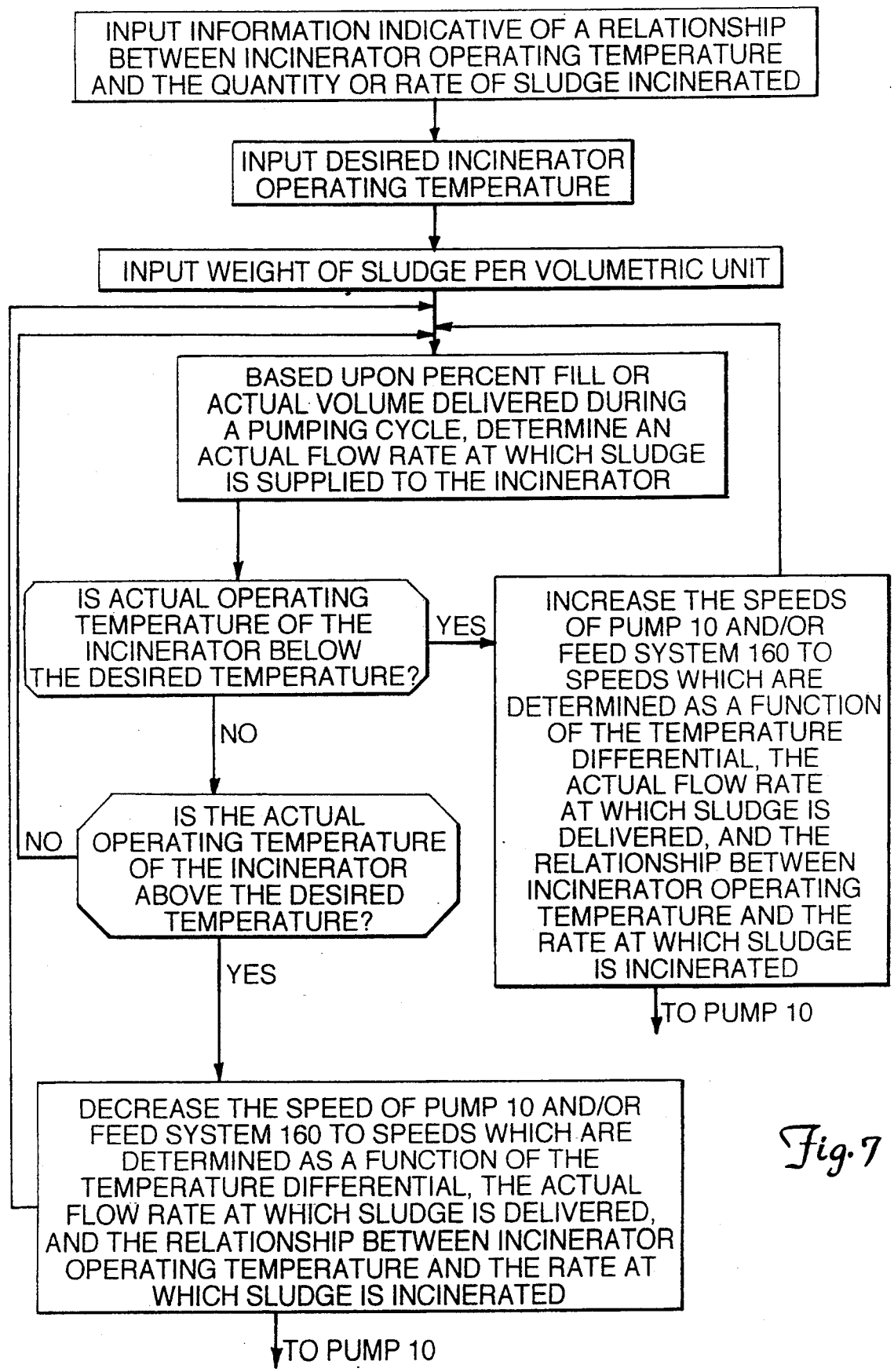
Figure 8:
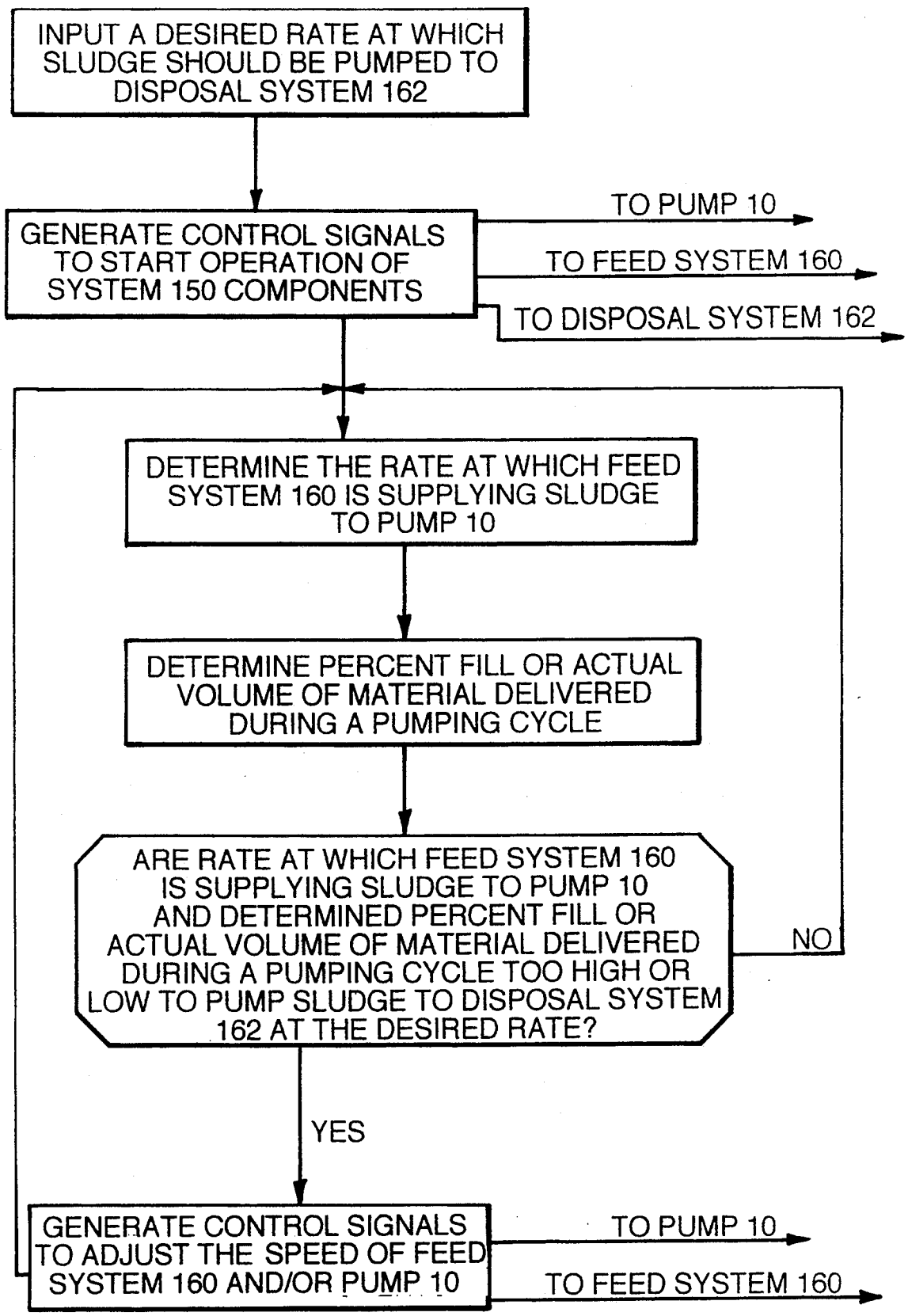

For example, in yet another preferred embodiment of the present invention which includes an incinerator in disposal system 162, computer 152 senses the incinerator operating temperature, compares it to a desired incinerator operating temperature and determines a difference between the sensed incinerator temperature and the desire incinerator temperature. Next, computer 152 determines how much more or less sludge should be supplied to disposal system 162 to obtain and maintain the desired incinerator temperature. Based upon the quantity of sludge being delivered with each stroke of pump 10, computer 152 generates control signals which cause feed system 160 and pump 10 to increase or decrease the rate at which sludge is delivered to disposal system 162. Two methods of controlling operation of material handling system 150 as a function of both an actual volume of sludge delivered and a parameter related to operation of sludge material feed system 160 or sludge material disposal system 162 are shown in the flow charts of FIGS. 7 and 8.

Although the present invention has been described with reference to preferred embodiments, worker skilled in the art will recognize that changes may be made in form and detail without departing from the spirit and scope of the invention.

What is claimed is:

1. A method of controlling operation of a sludge material handling system, the sludge material handling system having a positive displacement piston/cylinder pump, having a sludge material feed system which delivers sludge material to the positive displacement pump, and having a sludge material disposal system which receives and disposes of sludge material from the positive displacement pump, the positive displacement pump having an inlet for receiving sludge material delivered by the sludge material feed system and an outlet through which sludge material is delivered to the sludge material disposal system under pressure, the sludge material received at the inlet being partially compressible such that a reduction in volume of the sludge material occurs during a pumping cycle as it is pumped from the inlet to the outlet, the method comprising:

sensing a first parameter, the first parameter being related to operation of the pump and bearing a known relationship to an actual volume of sludge material delivered during a pumping cycle;

determining from the sensed first parameter an output value; and providing a control signal as a function of the output value.

2. The method of claim 1 wherein the sludge material feed system is controlled in response to the control signal.

3. The method of claim 2 wherein a rate at which the sludge material feed system delivers sludge material to the positive displacement pump is controlled in response to the control signal.

4. The method of claim 1 wherein the positive displacement pump is controlled in response to the control signal.

5. The method of claim 4 wherein a pumping speed of the positive displacement pump is controlled in response to the control signal.

6. The method of claim 1 wherein the output value represents an actual quantity of sludge material delivered by the pump during a pumping cycle.

7. The method of claim 1 wherein the output value represents an accumulated quantity of sludge material delivered by the pump during a plurality of pumping cycles.

8. The method of claim 7 wherein the sludge material handling system is controlled in response to the control signal in order to prevent the sludge material handling system from disposing of more than a predetermined quantity of sludge material.

9. The method of claim 1 wherein the output value represents a flow rate of sludge material delivered by the pump.

10. The method of claim 1 wherein the parameter sensed indicates a time following a beginning of piston movement when sludge material begins to flow out of the cylinder.

11. A control system for controlling a sludge material handling system, the sludge material handling system having a positive displacement piston/cylinder pump, having a sludge material feed system which delivers sludge material to the positive displacement pump, and having a sludge material disposal system which receives and disposes of sludge material from the positive displacement pump, the positive displacement pump having an inlet for receiving sludge material delivered by the sludge material feed system and an outlet through which sludge material is delivered to the sludge material disposal system under pressure, the sludge material received at the inlet being partially compressible such that a reduction in volume of the sludge material occurs during a pumping cycle as it is pumped from the inlet to the outlet, the method comprising:
means for sensing a first parameter, the first parameter being related to operation of the pump and bearing a known relationship to an actual volume of sludge material delivered during a pumping cycle;
means for determining from the sensed first parameter an output value; and
means for generating a control signal as a function of the output value.

12. The control system of claim 11 wherein the sludge material feed system is controlled as a function of the control signal.

13. The control system of claim 12 wherein a rate at which the sludge material feed system delivers sludge material to the positive displacement pump is controlled as a function of the control signal.

14. The control system of claim 11 wherein the positive displacement pump is controlled as a function of the control signal.

15. The control system of claim 14 wherein a pumping speed of the positive displacement pump is controlled as a function of the control signal.

16. A method of controlling operation of a sludge material handling system, the sludge material handling system having a positive displacement piston/cylinder pump, having a sludge material feed system which delivers sludge material to the positive displacement pump, and having a sludge material disposal system which receives and disposes of sludge material from the positive displacement pump, the positive displacement pump having an inlet for receiving sludge material delivered by the sludge material feed system and an outlet through which sludge material is delivered to the sludge material disposal system under pressure, the sludge material received at the inlet being partially compressible such that a reduction in volume of the sludge material occurs during a pumping cycle as it is pumped from the inlet to the outlet, the method comprising:
providing a control signal as a function of a fill percentage of the pump; and
controlling operation of the sludge material feed system as a function of the control signal.

17. The method of claim 16 wherein a rate at which the sludge material feed system delivers sludge material to the pump is controlled as a function of the control signal.

18. A method of controlling operation of a sludge material handling system, the sludge material handling system having a positive displacement piston/cylinder pump, having a sludge material feed system which delivers sludge material to the positive displacement pump, and having a sludge material disposal system which receives and disposes of sludge material from the positive displacement pump, the positive displacement pump having an inlet for receiving sludge material delivered by the sludge material feed system and an outlet through which sludge material is delivered to the sludge material disposal system under pressure, the sludge material received at the inlet being partially compressible such that a reduction in volume of the sludge material occurs during a pumping cycle as it is pumped from the inlet to the outlet, the method comprising:
providing a control signal as a function of a fill percentage of the pump; and
controlling operation of the sludge material disposal system as a function of the control signal.

19. The method of claim 18 further comprising:
controlling operation of the sludge material feed system as a function of the control signal.

20. A method of controlling operation of a sludge material handling system, the sludge material handling system having a positive displacement piston/cylinder pump, having a sludge material feed system which delivers sludge material to the positive displacement pump, and having a sludge material disposal system which receives and disposes of sludge material from the positive displacement pump, the positive displacement pump having an inlet for receiving sludge material delivered by the sludge material feed system and an outlet through which sludge material is delivered to the sludge material disposal system under pressure, the sludge material received at the inlet being partially compressible such that a reduction in volume of the sludge material occurs during a pumping cycle as it is pumped from the inlet to the outlet, the method comprising:
determining a fill percentage of the pump based upon a parameter related to operation of the pump; and
controlling operation of the sludge material feed system as a function of the fill percentage determined.

* * * * *